United States Patent
Heath

[11] 3,868,068
[45] Feb. 25, 1975

[54] SEAT BELT RETRACTOR
[75] Inventor: Robert Boyson Heath, St. Marys, South Australia, Australia
[73] Assignee: Kangol Magnet Limited, Carlisle, England
[22] Filed: Feb. 21, 1973
[21] Appl. No.: 334,199

[30] Foreign Application Priority Data
Feb. 22, 1972 Australia.............................. 8040/72

[52] U.S. Cl................ 242/107.4, 188/136, 188/139
[51] Int. Cl............................................ A62b 35/00
[58] Field of Search .......... 188/135, 136, 139, 140; 242/107.3, 107.4; 280/150 SB

[56] References Cited
UNITED STATES PATENTS

| | | | |
|---|---|---|---|
| 3,237,729 | 3/1966 | Proctor.............................. | 188/136 |
| 3,578,260 | 5/1971 | Kell................................... | 242/107.4 |
| 3,722,824 | 3/1973 | Hayashi ........................... | 242/107.4 |
| 3,758,044 | 9/1973 | Nilsson ............................ | 242/107.4 |

*Primary Examiner*—Duane A. Reger
*Attorney, Agent, or Firm*—Jay L. Chaskin, Esq.

[57] ABSTRACT

A seat belt retractor having an inertia sensing device which comprises a pin extending upwardly and having a weight with a central hollow in its under surface supported by the upper end of the pin, an actuator plate positioned above the weight and arranged to engage the upper surface of the weight upon tilting of the weight on the pin and thereby be moved upwardly by the tilting weight, and a pair of supported guides guiding the plate for movement in a direction co-axial with the pin, one of the guides being above and the other being below the weight so that jamming of the weight is subsequently avoided.

7 Claims, 3 Drawing Figures

SEAT BELT RETRACTOR

BACKGROUND OF THE INVENTION

This invention relates to a seat belt retractor having an inertia sensitive mechanism for locking the belt upon sudden impact.

It is usual with seat belt retractors to include a retractor spring so that the belt is wound onto a reel and is freely withdrawable from the reel against the action of the spring. However, such retractors are usually provided with inertia sensing means to sense impact so that upon impact the retractor is locked and the seat belt retains its position. Such retractors are described and illustrated in Australian Pat. Application No. 35159/68, corresponding to commonly assigned U.S. Pat. No. 3,508,720 and in (British Application No. 38772/71) corresponding to commonly assigned copending U.S. Pat. application No. 180,753, filed Sept. 15, 1971, and this invention is concerned with retractors of the general type described therein.

The inertia sensing means of U.S. Pat. No. 3,508,720 operates with a swinging weight (pendulum), the top of the weight having a flat surface which abuts a button, and upon tilting of the weight, an edge of the flat surface rises relative to the button and drives the button upwardly in a sleeve. The button in turn operates the locking mechanism for the locking of the seat belt. This arrangement is generally satisfactory and even under extreme conditions functions satisfactorily, but it is most desirable that the possibility of failure is maintained to an absolute minimum. Failure in the case of a button is theoretically possible upon the button itself tilting (if too loose within the sleeve) and resisting upward movement, or jamming (if too close within the sleeve) and again resisting upward movement. The existence of dust can have a deleterious effect with respect to proper tilting of the pendulum or alternatively jamming of the button within the sleeve.

The main object of this invention is to provide an inertia sensing device which will be even less likely to fail under adverse conditions than the device described in U.S. Pat., 3,508,720.

BRIEF SUMMARY OF THE INVENTION

A seat belt retractor according to this invention is provided with an inertia sensing device which comprises a pin extending upwardly and having a weight with a central hollow in its under surface supported by the upper end of the pin, an actuator plate positioned above the weight and arranged to engage the upper surface of the weight upon tilting of the weight on the pin, and a pair of spaced guides co-operable with the actuator plate guiding the plate for movement in a direction co-axial with the pin, one of the guides being above and the other being below the weight. With this arrangement a relatively small bearing surface between the upper end of the pin and the weight will avoid the presence of dust having a serious effect on the free tilting of the weight, and the existence of the widely spaced guide means for the actuator plate enable wide clearances to be utilized so that again the effect of dust will be negligible.

Further according to the invention, the retractor may comprise a shield secured to and depending from the actuator plate and surrounding the weight, a lower guide opening in the shield being slidable over the upwardly extending pin and constituting one of said guide means.

A further practical difficulty encountered in the production of inertia sensing devices for seat belt retractors is the existence of tolerances for dimension of manufactured parts, and these may accumulate to a point where the inertia sensing device is too "tight" or too "loose", and further in this invention the upwardly extending pin is provided with a lower threaded portion which threadably engages in an aperture in the housing to thereby form height adjustment means for the weight, which enables compensation for manufacturing dimension tolerance to be effected.

BRIEF DESCRIPTION OF THE DRAWINGS

An embodiment of the invention is described hereunder in some detail with reference to and is illustrated in the accompanying drawings, in which.

Figure 1:
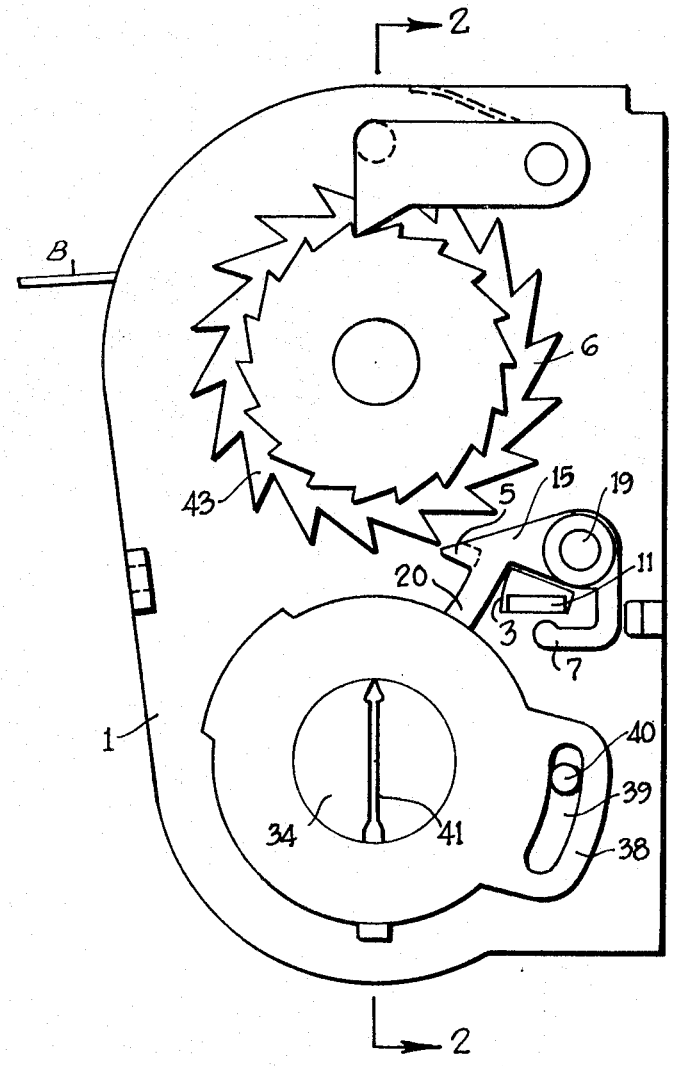
FIG. 1 is a side elevation of a seat belt retractor which is substantially similar to the retractor described in U.S. Pat. No. 3,508,720, but which incorporates an inertia sensing device according to this invention.
Figure 2:
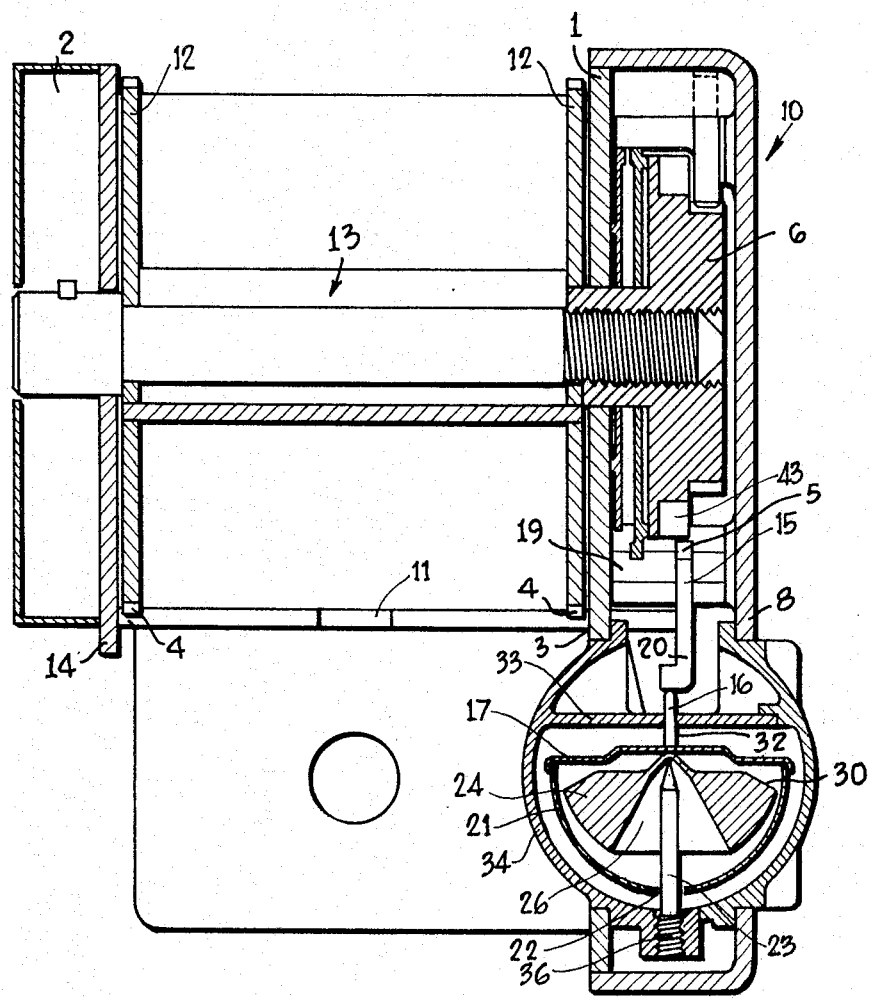
FIG. 2 is a section taken on plane 2—2 of FIG. 1, showing the inertia sensing device in greater detail.
Figure 3:
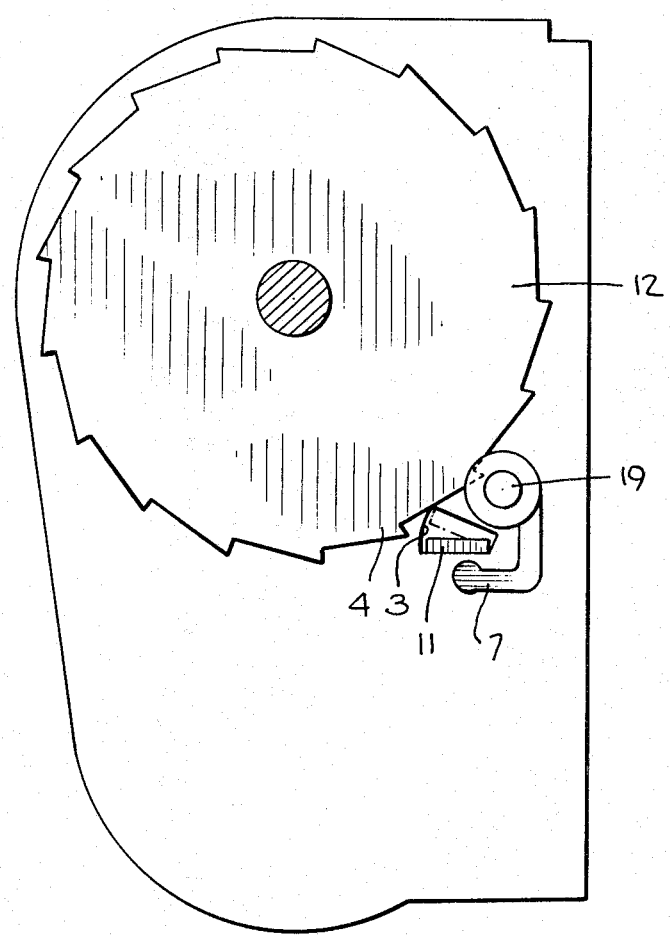
FIG. 3 is a section view, with some parts removed for clarity, showing the operation of the locking bar according to U.S. Pat. application No. 180,753.

In the drawing, a seat belt retractor 10 has a spool 13 rotatably mounted between two spaced parallel side plates. The spool 13 has wound thereon a seat belt B which can be withdrawn against the tension of a spring 2. In this embodiment the seat belt retractor 10 is provided with a locking bar 11 which engages teeth on the end plates 12 of a spool 13. A servo mechanism comprises a locking pawl 15 which is operable by means of a slidable actuator pin 16 upstanding from an actuator plate 17. Upward movement of the slidable actuator pin 16 moves the pawl 15 about its pivotal mounting 19 to rock the locking bar 11 into an engaged position where the end plates 12 are prevented from rotating. This mechanism is disclosed in detail in U.S. Pat. No. 3,508.720. The operation of the locking bar 11 is disclosed in U.S. Pat. No. application 180,753. As in said copending patent application, pawl 15 has a cranked arm portion 7 engageable with the locking bar 11 and a second arm portion 20 for receiving a mechanical input from an inertia sensing mechanism, to be described, as from the actuator pin 16. The locking bar 11 is disposed in apertures 3 in the side plates 1, 14 for pivotable rotation by the crank arm portion 7. The pawl 15 is pivotable from the inoperative position shown to a first intermediate position wherein the nose portion 5 can engage with one of teeth 43 of a ratchet wheel 6. Further pivoting of pawl 15, as by rotation of the engaged nose portion 5 and teeth 43, will cause the crank arm portion 7 to move the locking bar 11 into the operative position shown in dotted lines in FIG. 3, such that the bar engages teeth 4 of discs 12.

The slidable pin 16 is upstanding from the central portion of actuator plate 17 which is discoid shaped, the actuator plate 17 having a hollow shield 21 of hemispherical shape depending from its outer periphery. The shield 21 is provided with a central opening 22 which forms lower guide means, and through which passes a tapered pin 23, the upper end of the tapered pin 23 supporting a circular weight 24, the tapered pin extending upwardly to engage a central conical portion of a hollow 26 in the under surface of the weight 24. The pin 23 is contained within the conical hollow 26 so that the weight is free to tilt in any direction through an angle which is determined by the included angle of the conical hollow. The upper surface 30 of the weight 24 has a flat portion and a frusto conical portion surrounding the flat portions and the arrangement is such that upon tilting of the weight 24 on its supporting pin 23, the surface engages the under surface of the actuator plate 17. The weight is wholly contained within the hemispherical shield 21.

The slidable pin 16 is slidable through an opening 32 a segmental web 33 in a spherical housing 34, the opening 32 forming upper guide means. The lower end of the tapered pin 23 is provided with a threaded portion 36 which threadably engages a lower central aperture in the housing 34. Adjustment of the tapered pin urges the circular weight upwardly against the under face of the actuator plate, the upper end of the slidable pin then urging the pawl upwardly until its correct preset position is reached. To accommodate varying angles of inclination of the seat belt retractor, the housing 34 is provided with an outstanding lug 38 containing an arcuate slot 39. Housing 34 is received in aligned circular apertures in side plate 1 and spaced parallel wall 8. The housing is secured in a desired angular position by a locking screw 40 passing through the slot 39 and enables the pin 23 to be adjusted to lie in a vertical position even if the retractor is tilted. An arrow 41 marked on the housing 34 indicates the position of the pin 23.

Upon sudden change of momentum, for example if a motor vehicle tilts sharply, comes to a sudden halt, or is suddenly accelerated, the circular weight pivots about the tapered pin until its upper surface engages the under surface of the actuator plate, whereupon the actuator plate is urged upwardly to drive the pawl 15 into an engaged position with ratchet wheel 6 and in turn engage the locking bar 11 with the end plates 12. The upward movement of the slidable pin 16 is guided by the opening 32 through which it passes, and also by the central opening 22 in the hemispherical shield 21 which slides over the tapered pin 22. Thus the moment arm resisting the tendency of the actuator shield 21 to tilt is large and the guide means clearances therefore may be large, in turn ensuring actuation even under very adverse conditions.

There is a small space existing between the upper surface of the circular weight and the under surface of the actuator plate, so that, for example, the pawl does not engage the locking device if the vehicle is tilted at a kerb or lies on a steep incline. With this arrangement therefore it will be seen that the manufacturing tolerances of dimension in an axial direction all relate to the position of the tapered pin, so that by simple adjustment of the tapered pin in its screw threaded mounting, the pawl may be set in its correct position. The invention disclosed herein is described with respect to a preferred embodiment. It would be obvious to one skilled in the art that modifications may be made without departing from the invention. The scope of the invention, therefore, should be determined by the claims.

What I claim is:

1. A seat belt retractor having an inertia sensing device which comprises a pin extending upwardly from means secured relative to a seat belt retractor frame, a weight having a central hollow in its under surface and supported by the upper end of the pin engaging the surface of the weight which defines said central hollow, an actuator plate positioned above the weight and arranged to engage the upper surface of the weight upon tilting of the weight on the pin, and a pair of spaced guide means co-operable with the actuator plate guiding the plate for movement in a direction co-axial with the pin, one of the guide means being above and the other being below the weight.

2. A seat belt retractor according to claim 1 further comprising a shield secured to and depending from the actuator plate and surrounding the weight, a lower guide opening in said shield slidable over said upwardly extending pin and constituting one of said guide means.

3. A seat belt retractor according to claim 2 wherein the shield is of semicircular shape.

4. A seat belt retractor according to claim 2 wherein the actuator plate is contained within a housing.

5. A seat belt retractor according to claim 1 wherein the actuator plate is contained within a housing and is provided with a central upstanding slidable actuator pin, and a guide opening in the housing is slidably engaged by an actuator pin and constitutes one of said guide means, said actuator pin operably engaging a locking pawl to effect locking of the retractor upon upward movement of the actuator plate.

6. A seat belt retractor according to claim 5 wherein said housing is of spherical or part spherical shape and said guide opening therein is in a segmental web within said housing.

7. A seat belt retractor according to claim 5 wherein said upwardly extending pin is provided with a lower threaded portion which threadably engages in an aperture in said housing to thereby form height adjustment means for the weight.

* * * * *